Feb. 16, 1965
J. E. WEBB
ADMINISTRATOR OF THE NATIONAL
AERONAUTICS AND SPACE
ADMINISTRATION
ELASTIC UNIVERSAL JOINT
3,169,613
Filed March 7, 1962
2 Sheets-Sheet 1
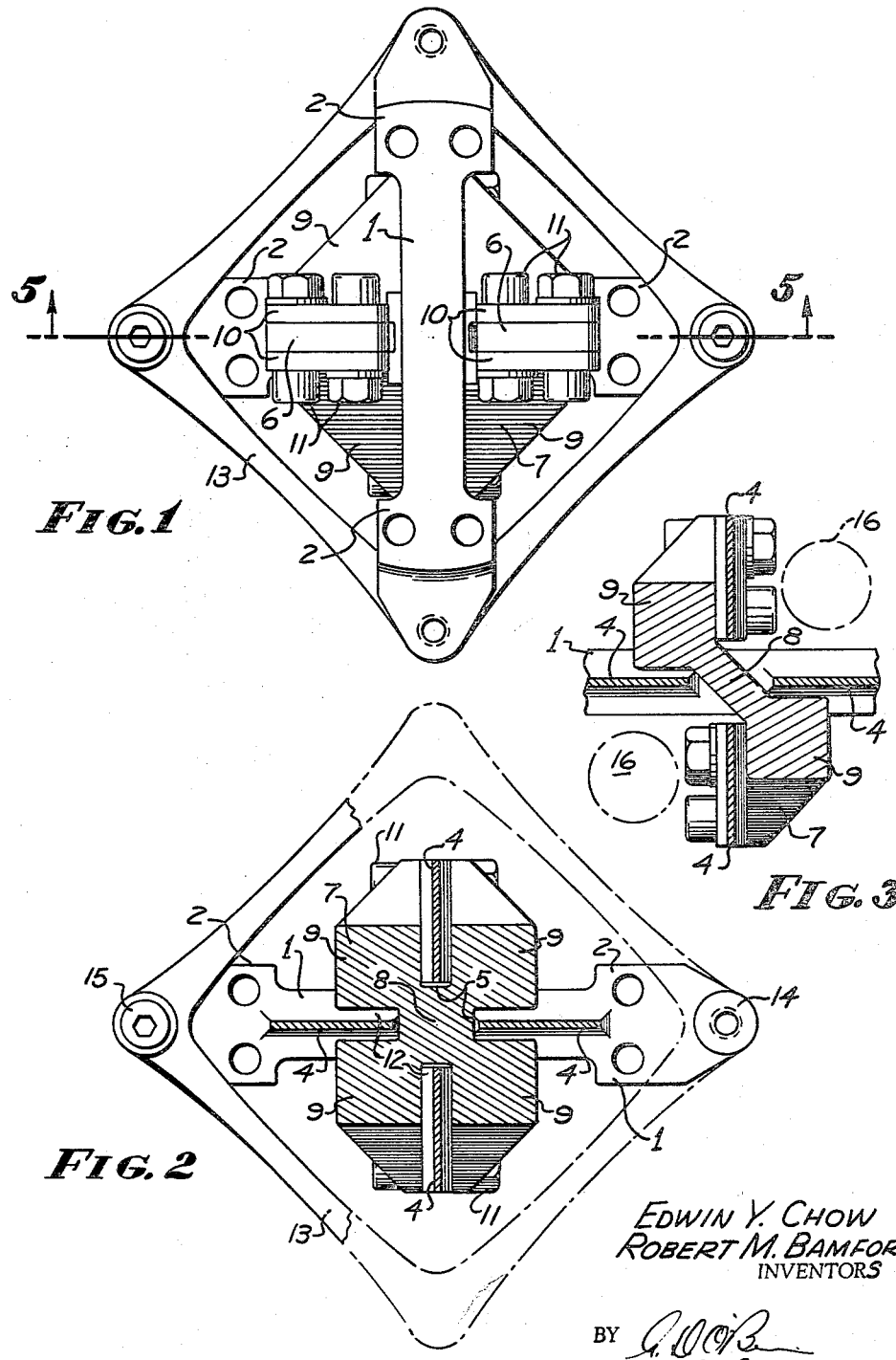
EDWIN Y. CHOW
ROBERT M. BAMFORD
INVENTORS
BY
ATTORNEYS Feb. 16, 1965

J. E. WEBB
ADMINISTRATOR OF THE NATIONAL
AERONAUTICS AND SPACE
ADMINISTRATION
ELASTIC UNIVERSAL JOINT 3,169,613

Filed March 7, 1962

EDWIN Y. CHOW
ROBERT M. BAMFORD
INVENTORS

BY
ATTORNEYS 3,169,613
ELASTIC UNIVERSAL JOINT
James E. Webb, Administrator of the National Aeronautics and Space Administration, with respect to an invention of Edwin Y. Chow and Robert M. Bamford
Filed Mar. 7, 1962, Ser. No. 180,395
2 Claims. (Cl. 189—36)

This invention relates to elastic universal joints, and included in the objects of this invention are:

First, to provide an elastic universal joint which is particularly adapted for the mounting of a rocket motor in a supporting structure to permit limited angular displacement of the rocket motor in order to effect guidance of a rocket vehicle.

Second, to provide an elastic universal joint which eliminates parts which must slide or roll with respect to each other and therefore eliminates the attendent problem of their lubrication under conditions of outer space.

Third, to provide an elastic universal joint which utilizes novelly arranged flexure plates which are in axially overlapped relation to provide an axially compact universal joint which allows the rocket motor to move about two mutually perpendicular axes.

Fourth, to provide an elastic universal joint which is particularly adapted to withstand high compression loads without affecting the flexibility of the joint so that the thrust of the rocket motor may be transmitted entirely through the universal joint to the rocket vehicle.

Fifth, to provide an elastic universal joint which may be so arranged as to provide space for passage of fuel lines to the rocket motor in close relation to the longitudinal axis of the rocket motor.

With the above and other objects in view as may appear hereinafter, reference is directed to the accompanying drawings in which:

FIGURE 1 is an axial end view of the elastic universal joint.

FIGURE 2 is a sectional view thereof in a plane parallel with FIGURE 1 taken substantially through 2—2 of FIGURE 4.

FIGURE 3 is a fragmentary sectional view similar to FIGURE 2 showing a modified form of the elastic universal joint.

Figure 4:
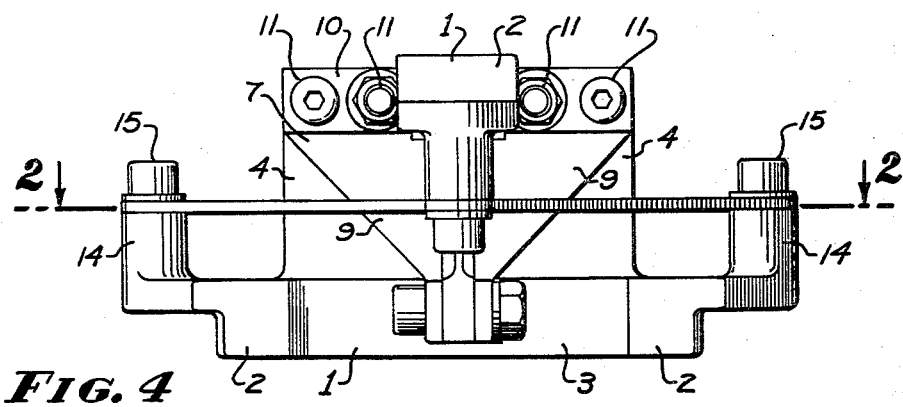
FIGURE 4 is a side view of the universal joint.
Figure 5:
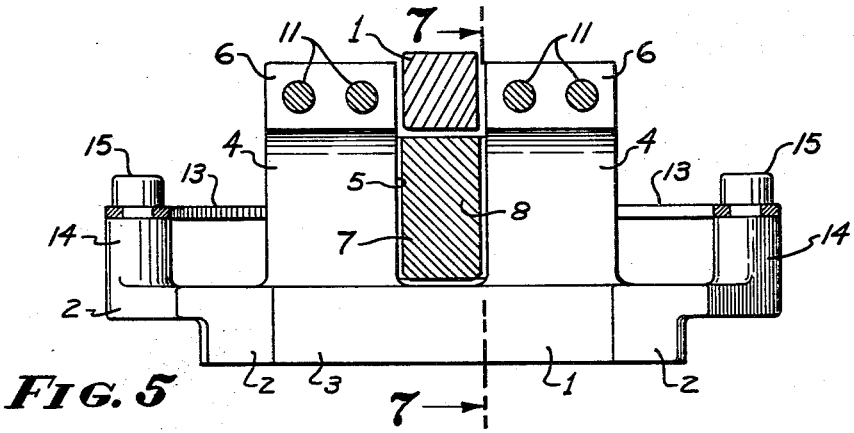
FIGURE 5 is a sectional view thereof in a plane parallel to FIGURE 4 and taken substantially through 5—5 of FIGURE 1.
Figure 6:
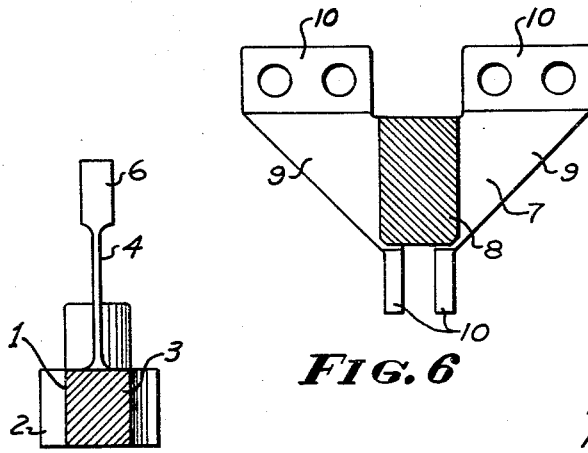
FIGURE 6 is a sectional view taken in the same plane as FIGURE 5 showing only the thrust transmitting block.
Figure 7:
FIGURE 7 is a sectional view taken through 7—7 of FIGURE 5 but showing only one of the flexure plate structures.

The elastic universal joint includes a pair of mounting bars 1 which are disposed at right angles to each other in the parallel planes so that their cross portions define an axis passing through both of these planes. The two mounting bars have enlarged ends 2. One mounting bar is joined by its enlarged ends to a rocket motor; whereas the other mounting bar is joined to a supporting frame. The rocket motor and supporting frame being omitted.

Between its enlarged ends each mounting bar forms a connecting web 3 from which extends axially a pair of flexure plates 4, separated by a slot 5. The two pairs of flexure plates are disposed at right angles to each other and axially overlap. The axial extremity of each pair of flexure plates is disposed at opposite sides of and at right angles to the mounting bar from which the other pair of flexure plates extend. The extremities of the flexure plates remote from the connecting webs 3 are laterally enlarged to form connecting pads 6.

The connecting pads 6 of the four flexure plates are adapted to be joined to a common thrust transmitting block 7. The thrust transmitting block 7 includes a central core 8 located between the mounting bars 1 and within the slots 5 formed between the flexure plates 4. Extending from the central core into the four quadrants defined by the right angularly disposed mounting bars and flexure plates are thrust members 9. The axially opposite extremities of each thrust member are provided with connecting fins 10 disposed at right angles to each other. The fins are disposed pairs at opposite sides of the connecting pads 6. They are secured thereto by bolts 11. Between the fins 10 the thrust members 9 form a clearance of slits 12 for the flexure plates 4.

Surrounding the flexure plates and thrust transmitting block, midway between the mounting bars 1, is a rectangular torsion and shear resisting frame 13. The extremities of each mounting bar are provided with posts 14 which extend to the torsion and shear resisting frame 13 and are joined thereto by bolts 15.

Operation of the elastic universal joint is as follows:

The universal joint is interposed between the rocket motor and supporting frame. The thrust of the rocket motor is transmitted through the mounting bar from which it is attached, the flexure plates integral therewith, then to the thrust transmitting block, then to the right angular disposed flexure plates and finally to the mounting bar connected with the supporting frame work.

Any torsional and shear forces are resisted by the frame 13. Sufficient clearance is provided between the flexure plates 4 and thrust transmitting block 7 to permit the desired angular displacement of the rocket motor. A displacement of 3 to 5 degrees is readily attained. Greater angular displacement may be permitted by providing increased clearances, however, as the angular displacement increases the thrust loads which may be transmitted are reduced. Angular displacement of the rocket motor is effected by suitable servo control mechanisms.

If there is any need for the propellant feed line of the rocket motor to be as close to the center line of the rocket motor as possible, it can be accomplished by the arrangement shown in FIGURE 3 which is identical to the previously described structure except that the two of the four diagonal thrust members 9 have been omitted. In the space thus provided fuel lines 16 may pass from the supply cells to the rocket motor.

While what hereinbefore has been described as the preferred embodiment of this invention, it is readily apparent that alterations and modifications may be resorted to without departing from the scope of this invention and such alterations and modifications are intended to be included within the scope of the appended claims.

We claim:
1. An elastic universal joint, comprising:
(a) a pair of mounting bars disposed at right angles in parallel planes, their cross portions defining a thrust axis passing through said planes;
(b) a pair of flexure plates extending from each of said mounting bars into axially overlapping relation, the pairs of flexure plates defining right-angularly related planes and defining a central clearance space in the region of said thrust axis between said mounting bars, the extremities of said flexure plates being increased in thickness to form mounting pads;
(c) a thrust transmitting block having a core in said clearance space and thrust members extending from the core to the mounting pads of said flexure plates for rigid attachment thereto;
(d) the mounting bars extending laterally beyond said thrust transmitting block and terminating in mounting posts;

(e) and a torsion and shear-resisting frame surrounding and spaced from said thrust transmitting block and secured to said posts.

2. An elastic universal joint, comprising:
 (a) right angularly related axially overlapping flexure plates defining a common axis;
 (b) a thrust transmitting block common to said flexure plates and joined to the axially opposite ends thereof;
 (c) right angularly related mounting bars at the remaining axial ends of said flexure plates, and projecting laterally beyond said thrust transmitting block;
 (d) and a torsion and shear-resisting frame encircling said thrust transmitting block in spaced relation thereto and rigidly secured to the lateral extremities of said mounting bars.

References Cited by the Examiner
UNITED STATES PATENTS 2,966,049  12/60  Ormond _____ 248—358 X RICHARD W. COOKE, JR., *Primary Examiner.*
JACOB L. NACKENOFF, *Examiner.*